April 23, 1957  J. R. BARTON  2,789,522
APPARATUS FOR INJECTING MATERIALS INTO THE EARTH
Filed Nov. 7, 1952  5 Sheets-Sheet 2
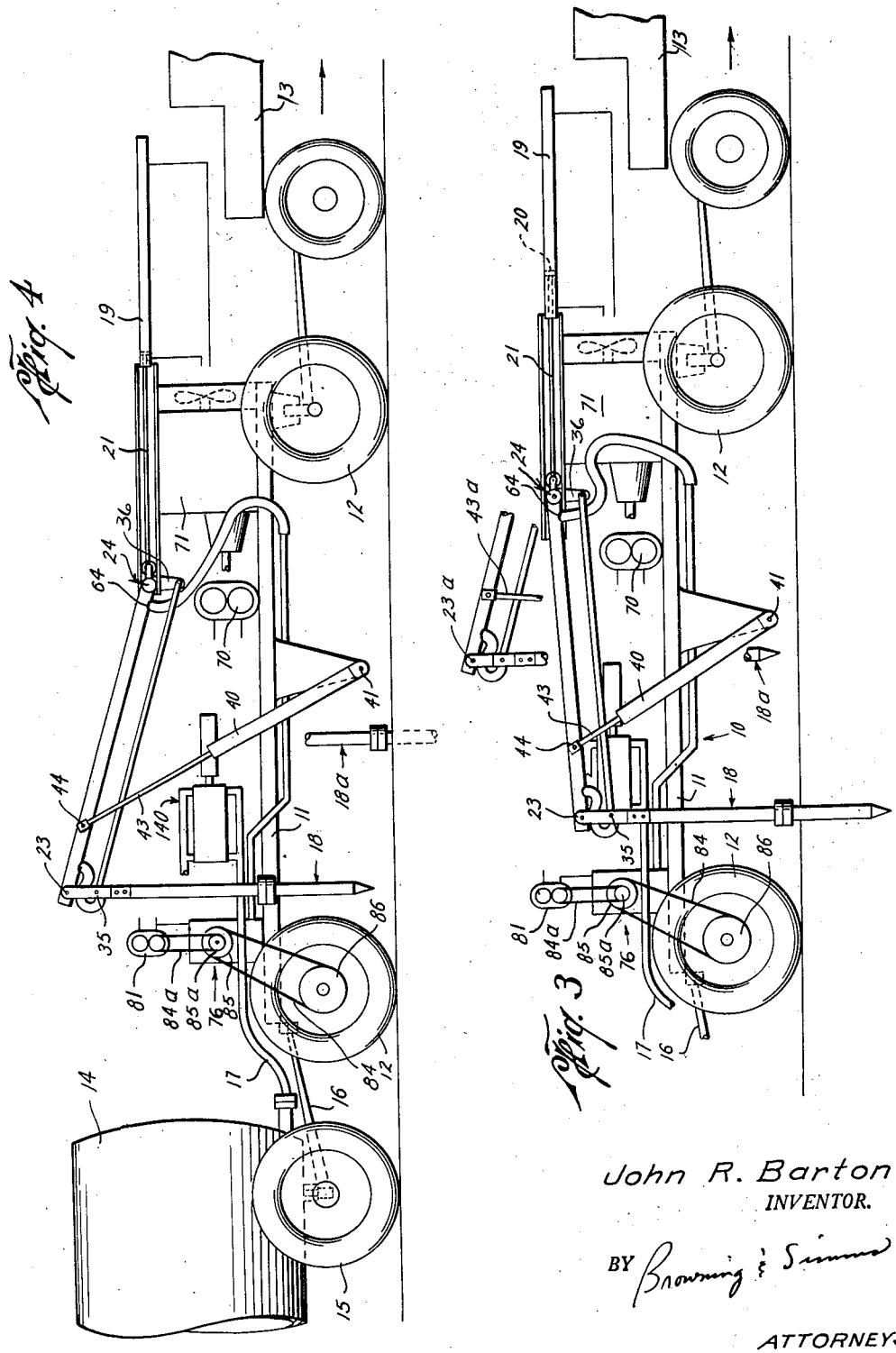
John R. Barton
INVENTOR.
BY Browning & Simmons
ATTORNEYS

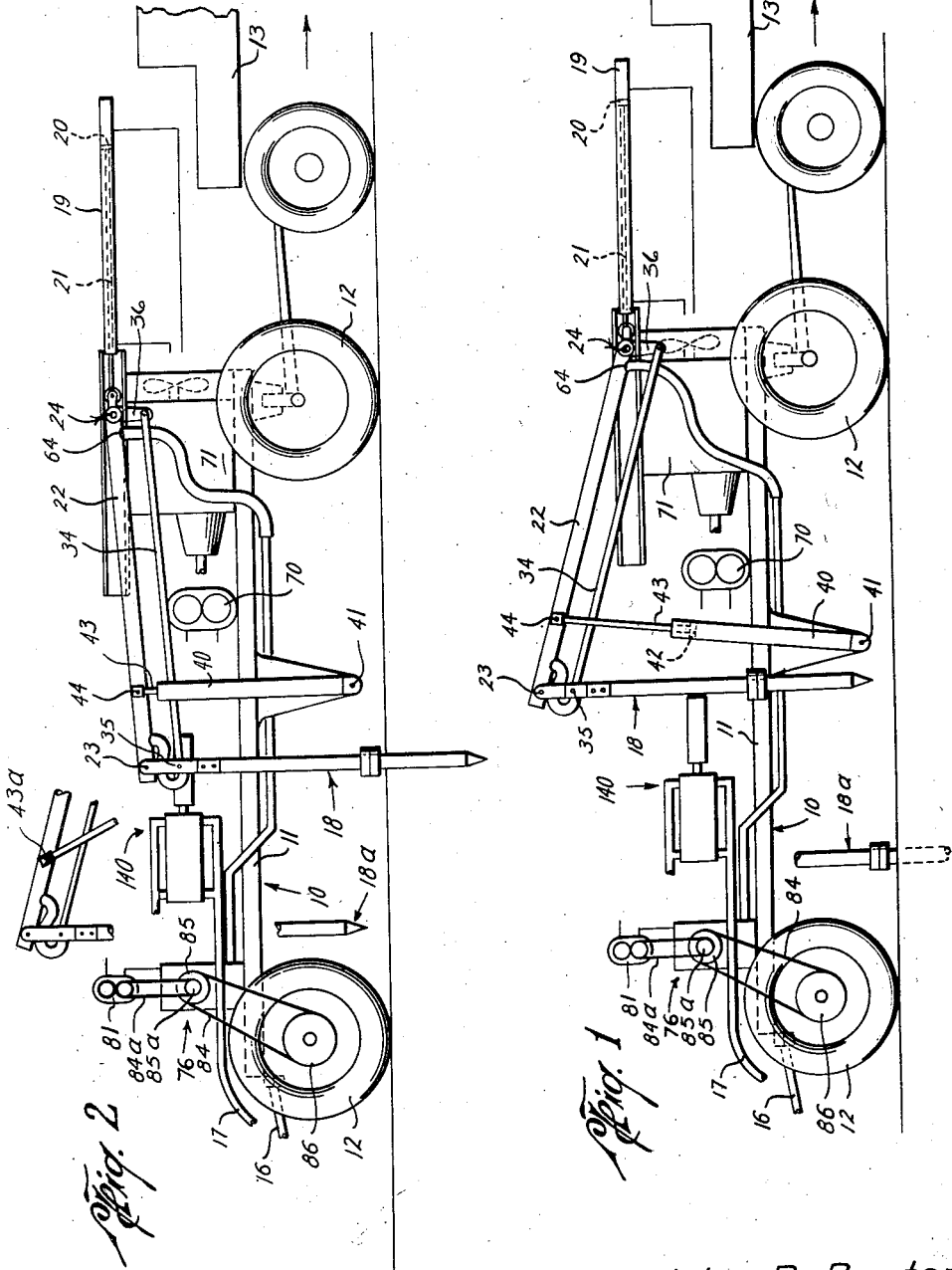

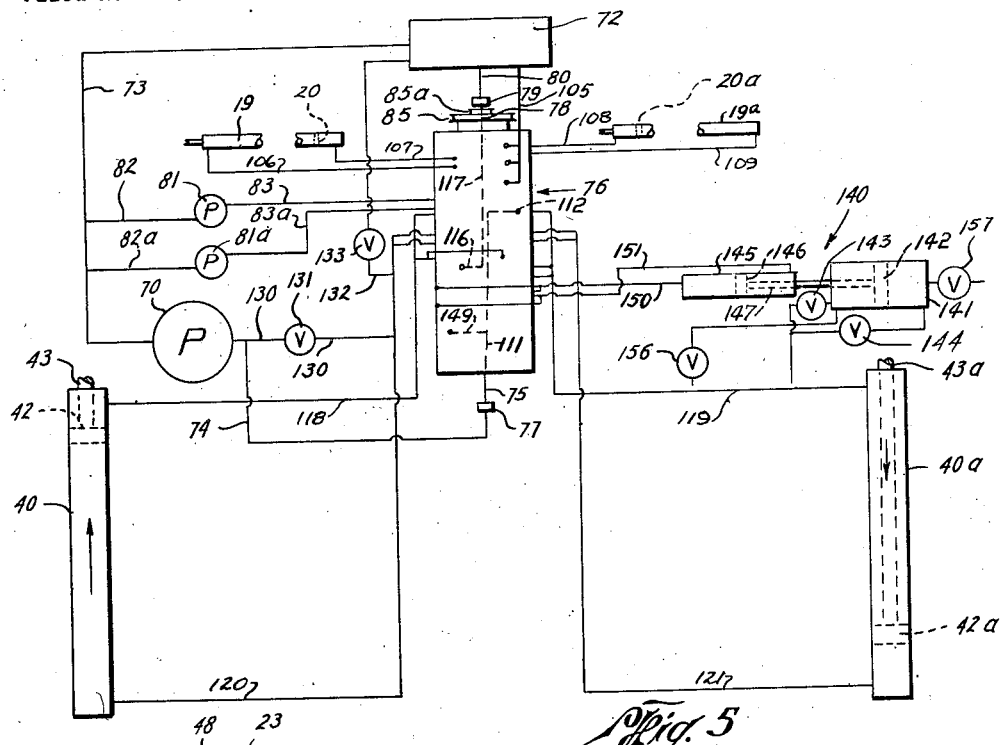
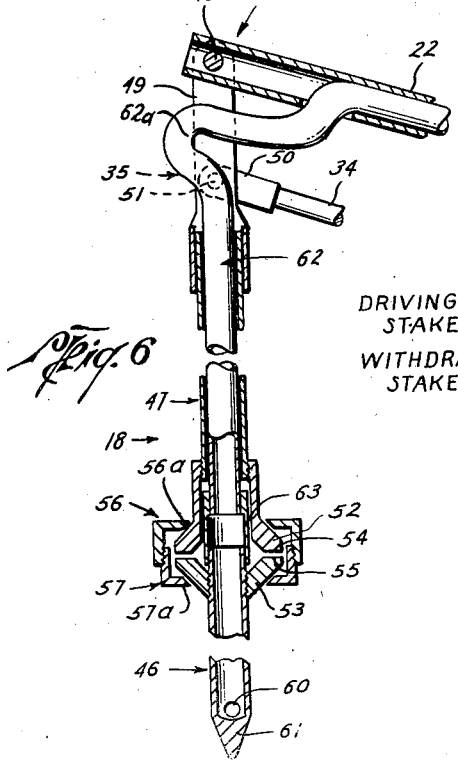
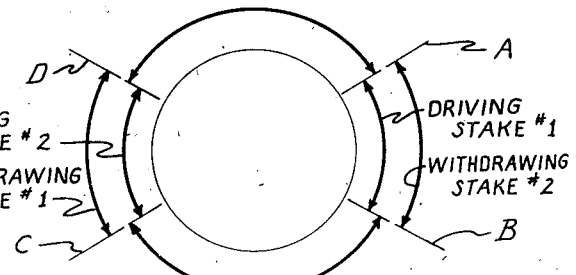

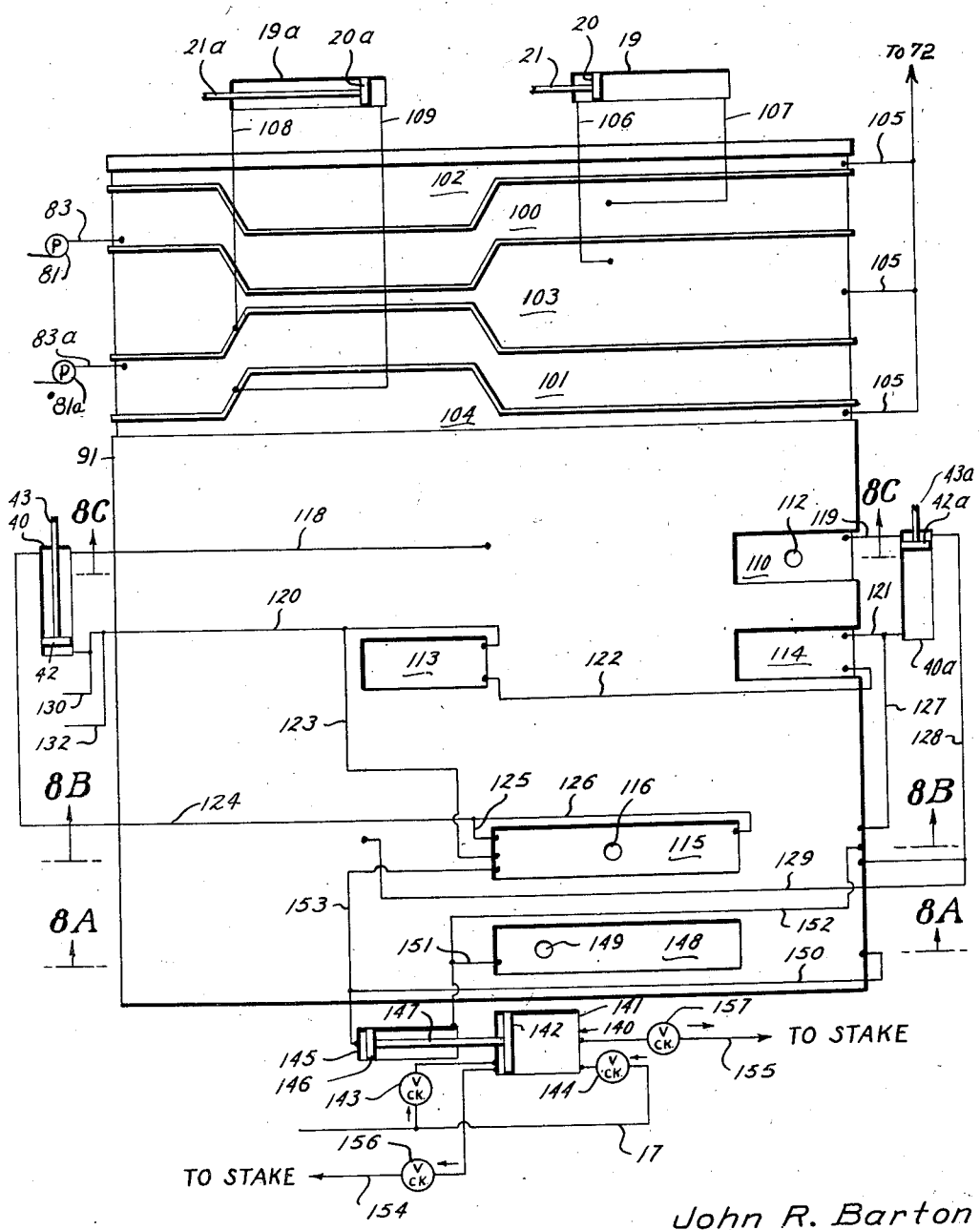

April 23, 1957   J. R. BARTON   2,789,522
APPARATUS FOR INJECTING MATERIALS INTO THE EARTH
Filed Nov. 7, 1952   5 Sheets-Sheet 5
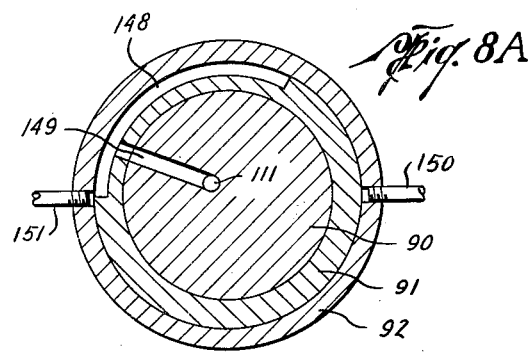
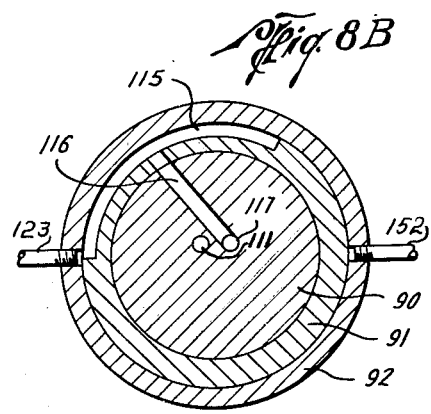
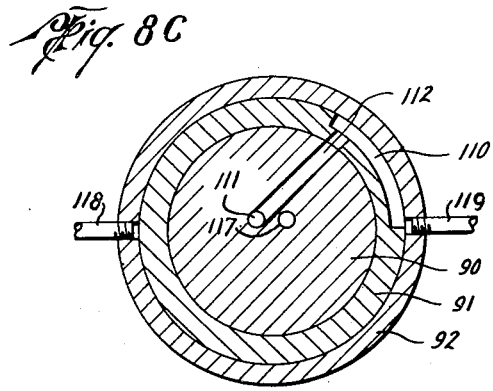
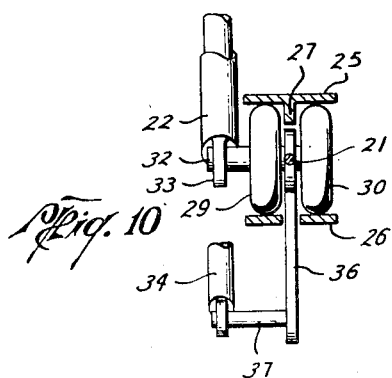
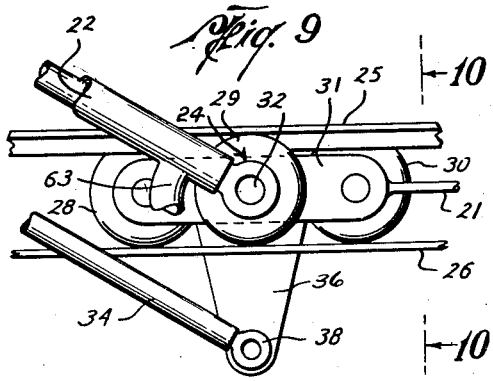
John R. Barton
INVENTOR.
BY
ATTORNEYS

United States Patent Office 2,789,522
Patented Apr. 23, 1957.

2,789,522

APPARATUS FOR INJECTING MATERIALS INTO THE EARTH

John R. Barton, Dayton, Ohio, assignor to C. A. Wherry, Modesto, Calif.

Application November 7, 1952, Serial No. 319,228

12 Claims. (Cl. 111—6)

This invention relates to an apparatus for injecting fertilizer or other materials into the earth's surface.

In many instances, it is desired to inject a liquid fertilizer at spaced points along the earth's surface. To secure a relatively even distribution of fertilizer over the area to be enriched, such injections are desirably made at intervals which are accurately spaced one from the other. Many times the injections must be made over terrain which may be relatively rough and which has varying degrees of resistance to the injection of fertilizer due to varying characteristics, such as penetrability, of the soil. Also, it is desirable to inject a fertilizer in such a manner that the earth's surface is disturbed to a minimum extent and so that the injected fluid remains below the surface of the ground.

It is an object of this invention to provide an apparatus for injecting a fluid, such as a liquid fertilizer, into the earth's surface at spaced points therealong, such injection being accomplished with a minimum of disturbance of the earth's surface and in such a manner that substantially all of the injected fluid remains below the surface of the ground.

Another object is to provide such an apparatus which can be pulled or driven over the earth's surface at a speed anywhere within a predetermined range and yet the space between the points of injection remains uniform and the amount of fluid injected per point also remains uniform.

Another object is to provide an apparatus having not only the foregoing characteristics but which can be readily constructed to make the injections a substantial distance beneath the earth's surface so as to be efficient in fertilizing relatively deep feeding plants such as trees and the like and yet which can be constructed to make relatively shallow injections suitable for feeding ordinary annual crops and the like.

Another object is to provide an apparatus for injecting fluid into the earth's surface wherein an injecting stake is moved horizontally in a direction opposite to that of a frame carrying the stake and is also moved vertically to drive it into and withdraw it from the earth, the vertical movement being effected independently of the horizontal movement so that the force required to drive the stake can be effectively controlled to accommodate varying soil conditions and to permit adjustment of the depth to which the fluid is injected.

Another object of the invention is to provide an apparatus wherein a stake is driven into the earth's surface to conduct fluid therein and withdrawn after such fluid has been injected, the time required for driving the stake, injecting the fluid and withdrawing the stake being dependent upon the rate at which a frame carrying the stake is moved along the earth's surface, the amount of energy being consumed to perform these operations being only that required in any particular instance irrespective of the normal variations in the conditions of the soil.

Another object of this invention is to provide a stake adapted to be driven into the earth in order to inject a fluid thereinto, the stake being mounted on a frame for movement therealong in a direction opposite to that of the movement of the frame, with means being provided to withdraw the stake after the fluid has been injected and return it to its original poistion to again be driven into the earth at a point spaced from just preceding point of injection, these operations being provided by a hydraulic system or equivalent synchronized with the rate of movement of the frame along the earth's surface.

Other objects, advantages and features of this invention will be apparent to one skilled in the art upon the consideration of the written specification, the appended claims and the attached drawings wherein:

Fig. 1 illustrates the apparatus of this invention at what may be designated the start of a cycle of operation;

Fig. 2 illustrates the apparatus in a second step of the cycle wherein the stake has been driven into the earth and just before liquid is injected through the stake into the earth;

Fig. 3 illustrates a position of the apparatus at a third step in the cycle just after the liquid has been injected into the earth and just before the stake is withdrawn;

Fig. 4 illustrates the apparatus in a fourth step position just after the stake has been withdrawn from the earth and just prior to its return to the Fig. 1 position;

Fig. 5 is a diagrammatic piping layout of a hydraulic apparatus employed to move the stake through its cycle and to inject fertilizer or other fluid into the earth's surface;

Fig. 6 is a elevational view, partially in cross-section and partially broken away, showing the details of stake construction;

Fig. 7 is a diagrammatic view further illustrating the cycle of operation of the apparatus of this invention;

Fig. 8 is the layout of a sleeve-type valve adapted to synchronize the various hydraulic operations with the movement of the appartus along the earth's surface;

Figs. 8A, 8B and 8C are views on the lines 8A—8A, 8B—8B, and 8C—8C of Fig. 8, respectively, and show the valve in cross-sectional view;

Fig. 9 is an enlarged detail view of a part of the apparatus; and

Fig. 10 is a view taken on the line 10—10 of Fig. 9.

Like characters of reference are used throughout the several views to designate like parts.

Generally, the apparatus of this invention includes a stake and appurtenant apparatus for cyclically performing the steps of (1) driving the stake into the earth, (2) injecting fluid through the stake into the earth, and (3) withdrawing the stake from the earth. The stake is carried on a vehicle frame and is moved toward the rear of the vehicle during the above three steps at the same rate as the vehicle moves forward, i. e. the stake does not move horizontally with respect to a point on the ground during these three steps. As a fourth step of the cycle, the stake is moved forward on the vehicle so that steps 1, 2 and 3 can again be performed with the stake maintained horizontally stationary relative to a new point on the ground which is spaced from the first point by a predetermined distance.

Referring now to the drawings, there is illustrated a vehicle 10 comprising a frame 11 mounted upon wheels 12 in a conventional manner. Such vehicle is adapted to be drawn over the earth's surface by means of a tractor 13 or the like connected to the vehicle by means of a suitable hitch. Alternatively, it is possible to provide a source of power upon vehicle 10 for driving the same. As shown in Fig. 4, a source of fluid to be injected, comprising a vessel 14 mounted on wheels 15, is attached by hitch 16 to the other end of vehicle 10. A flexible hose 17 or the like provides for passage of fluid from vessel 14 to the injection apparatus mounted on vehicle 10. Inasmuch as the apparatus of this invention is particularly adapted to inject large quantities of fluid into the earth's surface over a relatively short time, it is desirable to provide two or more vessels 14 which can be quickly connected to and disconnected from the vehicle 10 so that upon emptying of one vessel, another filled vessel can be employed while the first is being refilled. In this manner, the injection apparatus can operate without awaiting the refilling of the source of fluid supply. Also, vessel 14 can be made quite large without increasing the size of frame 11 to the point where vehicle 10 would be unwieldy in nature.

Mounted on frame 11 is a stake, designated generally by the numeral 18, adapted to be driven into the earth's surface and to conduct the fluid to be injected thereinto. Such injection, as well as the driving and withdrawal of the stake, forms part of a cycle of operation and is synchronized to the rate of movement of the frame 11 along the earth's surface. This will be more fully explained below.

Means are provided for mounting the stake 18 on frame 11 for horizontal movment therealong in such a manner that during the time while the stake is being driven, the fluid is being injected, and while the stake is being withdrawn, the lateral position of the stake is fixed relative to a point on the earth's surface. In other words, the stake is moved along frame 11 in a direction opposite to that which the frame is moving over the earth's surface and at a rate equal to the rate of movement of the frame along the earth's surface. Such mounting means can comprise a substantially horizontal cylinder 19 in which piston 20 is reciprocally received. A connection is provided between piston 20 and stake 18 including a piston rod 21, a supporting arm 22, the supporting arm having a pivotal connection at 23 with the stake and a pivotal connection at 24 with the piston rod. Guide and support means are provided to maintain pivotal connection 24 in a horizontal plane as stake 18 and arm 22 are moved back and forth by piston 20. As shown in Figs. 9 and 10, such means include parallel tracks 25 and 26 carried by frame 11. Track 25 has a web portion 27 on either side of which are wheels 28, 29 and 30. Such wheels are preferably rubber-tired and are journaled to shafts fixedly attached to plate 31 so that the resulting carriage assembly can be rolled along tracks 25 and 26 and maintained thereon by web portion 27 between wheel 29 and wheels 28 and 30. Piston rod 21 is connected to plate 31 to move the carriage assembly forward and backward along the track. Arm 22 is pivoted to shaft 32 of the pivotal connection, extending from plate 31 through wheel 29, the latter being journaled thereto, by means of an eye-type connector and bearing 33. With this construction, it is possible for hydraulic power to be applied to move the carriage assembly backwards and forwards along its guide and support track while permitting the supporting arm to pivot in a vertical plane and yet preventing its pivoted end from leaving a horizontal plane.

Means are provided for maintaining stake 18 in a fixed angular position, preferably vertical, relative to the earth's surface and yet permitting upward and downward movement thereof so that it can be properly driven into the earth. Such means comprises a second arm 34 disposed substantially parallel to arm 22 and having a pivotal connection 35 with stake 18. A third arm 36 is rigidly connected to plate 31, and hence to piston rod 21, and is disposed with its longitudinal axis at the desired angle at which the stake is to be maintained. As explained above, this angle is preferably at 90° to the ground level. Second arm 34 and third arm 36 are pivotally connected together by means of shaft 37 extending from arm 36 and an eye-type connector and bearing 38 carried by arm 34. Referring to views 1 to 4, it will be apparent that with this parallelogram construction, stake 18 will always be maintained parallel to third arm 36 whose angular inclination is fixed. In this manner, stake 18 can be maintained in a perpendicular position during the entire cycle of operation. Also, it is apparent that when piston 20 is moved from the Fig. 1 to the Fig. 2 position at the same rate relative to the frame, the latter moves with respect to the ground but in an opposite direction, stake 18 will not move with respect to a point on the ground while it is being driven, while the fluid is being injected and while the stake is being withdrawn. However, upon its withdrawal, it will be possible to return the stake from the Fig. 4 position to the Fig. 1 position to start a new cycle.

Means are also provided for vertically moving the stake independently of the means for moving the stake horizontally. The vertical moving means can comprise a cylinder 40 having one end pivotally attached to frame 11 at 41 and containing a piston 42 connected to piston rod 43. The piston rod has a force transmitting connection with the stake as by being pivotally connected at 44 to arm 22 so that upon movement of piston 42, arm 22 can be pivoted about pivot 24. It will be apparent that as piston 42 moves arm 22, stake 18 will be raised and lowered with respect to the ground so that it can be driven into and withdrawn from the earth.

Referring now to Fig. 6, the construction of the stake will be described in detail. As shown therein, the stake comprises generally an injecting conduit 46 adapted to be driven into the earth and a driving member 47 longitudinally aligned with the injecting conduit. The driving member is the portion of the stake which is pivotally connected to arms 22 and 34. Thus, arm 22 carries a shaft 48 on which is journaled the bifurcated end of plate member 49, the latter being an extension of driving member 47. Also, arm 34 has a plate extension 50 journaled to bearing shaft 51 on plate member 49. Shafts 48 and 51 are spaced apart a distance equal to the spacing apart of shafts 32 and 37 in Fig. 10.

Driving member 47 and injecting conduit 46 have a flexible joint therebetween constructed and arranged so that the endwise driving force exerted by member 47 can be effectively transmitted to conduit 46 and the two made rigid thereby while the stake is being driven into the ground and yet provide a loose connection between the member and conduit while fluid is being injected through the stake. As a result, any reasonable angular or up-and-down movement of frame 11 due to uneven surfaces of the earth cannot cause injecting conduit 46 to move in like manner while fluid is being injected and thereby disturb the position of the stake in the earth. Large up-and-down movements are compensated by possible movement of piston 43 described below. Such flexible joint is also constructed so that upon the application of an upward force to member 47 to withdraw conduit 46 from the earth, these two elements are effectively connected together. The flexible joint or connecting means comprises two laterally outward extending portions or flanges 52 and 53 connected respectively to member 47 and conduit 46. These flanges have annular bearing surfaces 54 and 55, respectively, which oppose each other and are adapted to be in abutment when the member 47 exerts a force to drive a conduit 46 into the ground. By displacing bearing surfaces 54 and 55 outwardly of and around member 47 and conduit 46, the tendency of the flexible joint to buckle while the stake is being driven into the ground is substantially eliminated.

A connector and guide is provided between conduit 46 and member 47 limiting their movement apart upon movement of the driving member away from the conduit but guiding the flanges 52 and 53 to be in abutment upon movement of the member toward the conduit. Such connector can comprise annular collars 56 and 57 having inner surfaces 56a and 57a, respectively, adapted to engage flanges 52 and 53. These annular collar members are threadedly connected for ease of assembly and disassembly. It will be noted that the inner surfaces 56a and 57a are spaced apart sufficiently so that they engage flanges 52 and 53 after the latter have been moved apart a substantial distance. It will also be noted that these surfaces maintain flanges 52 and 53 in substantial alignment so that bearing surfaces 54 and 55 will likewise be properly aligned when force is applied to drive the stake.

Injecting conduit 46 is hollow along a substantial portion of its length to provide a fluid passage and has one or more fluid discharge ports 60 near its lower end. The lower end of the conduit is fashioned into a point, as at 61, to facilitate driving of the stake into the earth. Driving member 47 is likewise hollow and is open at its upper end adjacent to connecting plate 49 to receive a flexible fluid-conducting tube 62 which terminates just below the lower end of member 47. The lower end of tube 62 is joined in a fluid tight joint to conduit 46 by a flexible sleeve 63. The latter is preferably made of soft rubber so that driving member 47 is free to move, within the limits above defined, with respect to conduit 46. Tube 62 is likewise flexible and a gooseneck portion 62a is provided at the top of the stake so that the latter is free to pivot with respect to arm 22, and to permit free vertical motion of tube 62 relative to driving member 47 resulting from any relative vertical movement between the latter and conduit 46 permitted by the flexible joint. Tube 62 passes into arm 22 through a side opening therein adjacent pivot 23, continues through the arm to emerge at the other end at 64, and then is connected to a means for forcing fluid through the stake which is described in detail below.

While it is permissible to use a single stake operating at one side of a vehicle as described above, it is usually preferable to use two stakes, one operating from each side of the vehicle. The second stake is constructed and arranged in exactly the same manner as described above and has its own mounting means and its own means for driving it vertically. These stakes operate on an integrated time cycle which will next be discussed before giving the details of the system for actuating the stakes and injecting the fluid.

Referring to Fig. 7, the operating cycle is represented in the usual circular fashion with time being represented by the circumference of the circle. In the interval from A to B, the first stake is driven while the second stake is pulled so that at B, the first stake has been driven into the earth while the second stake has been withdrawn. In the B—C interval, the liquid to be injected is forced through the first stake into the ground, and, simultaneously, the second stake is moved to a forward position on the vehicle. In C—D interval, the first stake is withdrawn from the earth while the second stake is driven back into the earth. It will be noted that this portion of the cycle is the reverse of the A—B portion. During the D—A portion of the cycle, the second stake conducts the fluid to be injected into the earth while the first stake is being moved forward.

A hydraulic control and actuating system is provided to effect the various movements of the stake and the injection of the fluid in accordance with the cycle above described. Further, the operations occurring during the cycle are synchronized with the rate of movement of the vehicle over the earth's surface in such a manner that the points of fluid injection are uniformly spaced apart irrespective, within a predetermined range, of the rate of speed of the vehicle. In this manner, it is not essential that the operator of the tractor 13 accurately adjust the rate of speed but only that he maintain it within the predetermined range. Accordingly, there is always insured a uniform amount of injected fluid per acre of ground covered by the apparatus.

Referring to Fig. 5, a two stake hydraulic system is shown schematically with the parts for one stake numbered as described above with reference to Figs. 1 to 4 and the corresponding parts for the other stake numbered in like manner but with the postscript "a." It will be seen that there is provided a hydraulic pump 70 which can be driven by a suitable engine 71 as shown in Figs. 1 to 4. Pump 70 is employed to actuate pistons 42 and 42a as well as the pumping mechanism for the fluid to be injected. This pump has the characteristic that the work performed by the pump is proportional to the discharge pressure as well as to the discharge volume and is exemplified by the various positive displacement types of pumps, such as a gear pump. With such an arrangement, the work output of the pump will always equal the work load required to actuate the stake driving pistons and the fluid injection system plus friction losses. This work load will vary from time to time. For example, the pressure of hydraulic fluid required to drive a stake will vary with soil conditions. If the soil is loose so that the stake is easily driven, the pump discharge pressure and hence the work load to drive the stake will be relatively low while if the soil is hard so that the stake can be driven only by the application of a relatively high hydraulic pressure, the pump will do more work to supply the higher hydraulic pressure required to drive the stake. As a result, the power consumed in driving the pump is at a minimum consistent with the power required to drive the stakes, inject the fluid and withdraw the stakes.

Pump 70 takes suction from a hydraulic reservoir 72 via conduit 73 and discharges into a conduit 74. Conduit 74 is connected via conduit 75 to a rotary valve mechanism, designated generally by the numeral 76 which is adapted to distribute the hydraulic fluid in a programmed sequence to the various pistons operated by pump 70. A rotary union 77, of conventional design, can be employed to permit conduit 75 to rotate with respect to conduit 74. At the other end of the rotory valve mechanism, a fluid discharge conduit 78 is connected through a rotary union 79 to a conduit 80 which discharges into reservoir 72 thereby completing the cycle of fluid circulated by pump 70.

To actuate pistons 20 and 20a, positive displacement pumps 81 and 81a are provided to take suction via conduits 82 and 82a, respectively, from the reservoir and to discharge into the respective conduits 83 and 83a. Pumps 81 and 81a are connected on a common drive shaft which is driven by belts 84 and 84a connecting it via pulleys 85, 85a and 86 to one of the wheels 12 rolling along the earth's surface. In this manner, means are provided for synchronizing the pumps to the rate of movement of the frame along the earth's surface so that the rate of discharge of pumps 81 and 81a is each directly proportional to the speed of vehicle 10.

As shown in Figs. 5, 8 and 8A, the rotary valve mechanism of this invention comprises a central shaft 90 carrying a sleeve 91, the two being suitably secured to each other to rotate together in a casing 92. Shaft 90 carries pulleys 85 and 85a on an extension thereof so as to be driven by one of wheels 12 in direct proportion to the speed of vehicle 10. Casing 92 is fixed to the frame of the vehicle. The speed of rotation of shaft 90 relative to that of wheel 12 can be suitably adjusted by proportioning the sizes of the various pulleys.

Referring to Fig. 8, there is shown a development of sleeve 91. It will be understood that the horizontal direction in Fig. 8 represents the circumference of the sleeve whereas the vertical direction represents the length of the sleeve. The various cylinders and pistons operated by the hydraulic system have been schematically included in this figure as have the conduits connecting them to the valve and the latter to pumps 81 and 81a and to reservoir 72. As illustrated in Fig. 8A, these conduits are tapped through casing 92 to provide communication with the inner portion of the casing and with the circumference of the sleeve and these taps are represented in Fig. 8 by enlarged dots so that the horizontal spacing of these taps represents the angular spacing on the actual casing.

Referring now to Fig. 8, pistons 20 and 20a are actuated by a fluid passing through slots 100 and 101. Slots 100 and 101 are connected at all times to pumps 81 and 81a, respectively, by conduits 83 and 83a being tapped through casing 92 to be in communication with the slots. Slots 102, 103 and 104 are connected to reservoir 72 by conduit 105 so that the slots are always open to the reservoir. The rear end of cylinder 19 is connected to conduit 106 which is tapped into casing 92 to be in alternate communication with slots 100 and 103 so that upon rotation of sleeve 91, conduit 106 will be connected alternately with pump 81 and the reservoir in a timed sequence. The forward end of cylinder 19 is connected by conduit 107 to be in alternate register with slots 100 and 102 upon rotation of the sleeve. In a similar manner, the rear end of cylinder 19a is connected by conduit 108 to provide communication with slot 101 (pump 81a) and slot 103 (reservoir) and the forward end of cylinder 19a is connected by conduit 109 to be in alternate communication with slots 101 and 104. With this arrangement, fluid pressure from pumps 81 and 81a will maintain slots 100 and 101, respectively, under fluid pressure at all times. As the sleeve is rotated in a clockwise direction from the Fig. 8 position, pressure fluid flows from pressure slot 101 into conduit 109 to the forward end of cylinder 19a. As the piston 20a moves to the rear, fluid flows through conduit 108 to reservoir slot 103. This operation continues through 240 degrees of the operating cycle, that is, while the stake connected to piston rod 21a is being driven into the ground, while fluid is being injected through this stake and while this stake is being pulled. During the first 60 degrees of this portion of the cycle, pressure fluid is also passing via conduit 107 to the forward end of cylinder 19 while fluid is discharged via conduit 106 into reservoir slot 103. However, as soon as the sleeve has rotated 60 degrees from its Fig. 8 position, the application of fluid pressure to piston 20 is reversed by placing conduit 106 in communication with pressure slot 100 and conduit 107 in communication with reservoir slot 102. While in such communication, piston 20 and the stake connected thereto are moved forward to their forwardmost position on the vehicle. This movement forward of piston 20 occupies 120 degrees of the cycle as compared to the 240 degrees required to move it to its rearmost position. Since the volume of fluid available to operate pistons 20 and 20a is constant at any given vehicle speed, piston rod 21 is constructed of such cross-sectional area as to occupy one-half of the internal volume of cylinder 19. As a result, the piston will be moved forward at twice the speed it is moved to the rear. The same relationship exists for piston rod 21a and cylinder 19a.

During the last 120 degrees of the cycle for piston 20a, the application of fluid pressure thereto is reversed, as described above with respect to piston 20, to move piston 20a forward on the vehicle to start a new cycle. During this same 120 degrees of cycle, piston 20 is moving toward the rear of the vehicle while fluid is injected through the stake carried thereby.

From the foregoing, it will be seen that by suitably sizing pumps 81 and 81a, pistons 20 and 20a can be moved the required distance and their rate of movement will be directly proportional to the speed of the pump which in turn is proportional to the speed of the vehicle. In this manner, the stakes can be moved toward the rear of the vehicle at a rate exactly equal to the forward movement of the vehicle so as to maintain the stake in fixed position relative to the ground.

Referring to piston 42 and its mode of operation, the same system of numbering the piston and its counterpart for the stake on the opposite side of frame 11 is employed as outlined above. To operate pistons 42 and 42a, pressure slot 110 is provided in the sleeve and is in communication with pump 70 and conduit 75 by means of longitudinal passage 111 and a lateral passage 112 in shaft 90 as shown in Fig. 8C. Blank slots 113 and 114 are provided and these are not placed in direct communication with pump 70 or reservoir 72. Reservoir slot 115 is placed in communication with reservoir 72 by a lateral passage 116 which connects with a longitudinal passage 117, the latter being an extension of conduit 78. To the upper ends of cylinders 40 and 40a are connected conduits 118 and 119, respectively, and these are tapped into casing 92 at spaced points and are aligned to register with pressure slot 110 (Figs. 5, 8 and 8C). Thus, pressure fluid can be applied to the upper sides of pistons 42 and 42a in an alternate manner to drive the stakes into the ground through the A—B and C—D (Fig. 7) portions of the operating cycle. It will be noted that pressure slot 110 is so positioned on the sleeve relative to slots 100, 101, 102, and 103 that each of pistons 42 and 42a is started on its downward stroke at the same time that each of pistons 20 and 20a, respectively, is started on its rearward stroke.

The fluid from the lower end of cylinder 40 is transmitted to the lower end of cylinder 40a upon a downward movement of piston 42, and vice versa, in order that the downward movement of one piston will drive the other piston upwardly. On the other hand, when one of the pistons is in its downmost position with its stake driven into the ground, fluid is by-passed around the piston so that lateral or vertical movement of vehicle 10 with respect to the stake in an amount greater than can be compensated for by the flexible joint in the stake will be compensated for by movement of the piston to prevent the stake from being moved into or out of the ground. This by-passing of a piston occurs only while the stake is in the ground. After the stake has been withdrawn and while it is being moved to its forwardmost position on the vehicle, the fluid is trapped on the underside of the piston to hold the stake in a raised position. To provide this, the lower end of each cylinder is connected by conduits 120 and 121 to be in communication with blank slots 113 and 114, respectively, and a by-pass conduit 122 is provided between the slots to permit flow of fluid therebetween. The lower end of cylinder 40 is also connected by conduits 120 and 123 to be in communication with reservoir slot 115 during the time the by-passing around the piston 42 is desired. The upper end of cylinder 40 is in communication via conduits 124 and 125 with reservoir slot 115 thereby completing the by-pass around piston 42. Another conduit 126 is provided to register with reservoir slot 115 and empty fluid from the upper part of cylinder 40 while piston 42 is being raised. In a similar manner, conduits 128 and 127, respectively, connect the upper and lower portions of cylinder 40a with reservoir slot 115 to provide by-passing around piston 42a while it is in its lowermost position. Also conduit 129 connected to conduit 128 communicates with reservoir slot 115 to empty the upper portion of cylinder 40a while piston 42a is being raised.

With this arrangement, it will be apparent that as the sleeve rotates clockwise from its Fig. 8 position, pressure fluid will be provided from slot 110 to the upper side of piston 42a to drive it downwardly and drive the stake connected thereto. Simultaneously, the lower end of cylinder 40a is connected to the lower end of cylinder 40 via conduit 121, slot 114, conduit 122, slot 113 and conduit 120. In this manner, the fluid forced out of the lower portion of cylinder 40a will cause piston 42 to be raised to its upper position. This operation occurs during 60 degrees of rotation of the sleeve. Immediately thereafter, fluid is by-passed around piston 42a by conduits 127 and 128 registering with reservoir slot 115. This by-passing continues during the 120 degrees portion of the cycle while fluid is being injected through the stake. While this is occurring, the by-pass provided around piston 42 by conduits 120, 123, 124 and 125 will be closed, so that this piston is held in its uppermost position while its stake is being moved to its forwardmost position on the vehicle. During the next 60 degrees of cycle, piston 42 will be moved downwardly by pressure fluid from slot 110 passing through conduit 118. At the same time, the lower end of cylinder 40 is connected with the lower end of cylinder 40a by conduits 120 and 121 coming into register with slots 113 and 114 respectively and by conduit 122 interconnecting slots 113 and 114. Then, during the next 120 degrees of cycle while the fluid is being injected through the stake connected to piston 42, fluid will be by-passed around piston 42 by reservoir slot 115 coming into register with conduits 123 and 125 and by conduits 120 and 124 connected to conduits 123 and 125 respectively. At this same time fluid is trapped below piston 42a.

As stated above, pump 70 is driven by engine 71. The latter's speed can be controlled by a governor calibrated in terms of the speed of vehicle 10 so that the volume output of pump 70 is proportional to the speed. A minor difference in speeds is not serious; however, if desired, an automatic control can be connected to the governor of engine 71 to vary its speed in exact accordance with that of vehicle 10. To prevent excessive pressures from building up in the discharge from pump 70, a by-pass 130 containing a pressure relief valve 131 is connected to discharge into the hydraulic circuit between and including the lower ends of cylinders 40 and 40a as by connection to conduit 120. An additional relief from this circuit is provided in the form of conduit 132 and relief valve 133 to by-pass fluid into reservoir 72. Relief valve 131 is set to open at a pressure above while valve 133 is set to open at a pressure below that required to drive the stakes. Valve 133 should, of course, also be set to open at a pressure above the pressure required to withdraw the stakes. Then should pump 70 be discharging fluid at a rate greater than is needed, the excess can by-pass into reservoir 72. By passing the excess fluid into the hydraulic circuit in communication with the lower ends of cylinders 40 and 40a, any leakage from this circuit, such as past pistons 42 or 42a, which would cause the distance traveled by the stakes to be shortened, will be compensated. Further, should one of the stakes be prevented from entering the earth's surface the required distance, as by striking a rock, the other stake would not be fully lifted due to the closed system between cylinders 40 and 40a. For example, suppose the stake connected to piston 42 struck a rock before it was fully driven. The quantity of fluid necessary to move piston 42 the remainder of the required distance to drive its stake into the earth would be by-passed through conduit 130 into the closed system between the lower ends of cylinders 40 and 40a. This would cause piston 42a to continue its upward movement and to be fully lifted. Upon the next downstroke of piston 42a, the excess fluid in the closed system would escape through conduit 132 as soon as piston 42 has reached the end of its upward stroke.

It will be obvious from the foregoing that the speed of pump 70 relative to that of vehicle 10 can be controlled to in turn control the depth to which the stakes are driven. Also, the pump can be periodically speeded up, if desired, so that fluid will by-pass into the closed system between the lower ends of cylinders 40 and 40a to compensate for leakage if such should occur.

As stated above, a means or pump mechanism is provided for supplying measured volumes of fluid from vessel 14 to the passage in the stakes for injection into the ground. This pump mechanism is designated generally by the numeral 140 and includes a chamber or cylinder 141 which can be considered as a part of the conduit between the stake and source of fluid to be injected. A movable part or piston 142 is disposed in the cylinder to vary the effective volume thereof. The forward and rearward ends of this cylinder are connected to conduit 17 and these connections are provided with check valves 143 and 144 allowing flow into the cylinder but preventing flow from the cylinder back into conduit 17. An actuator is provided for moving piston 142 responsive to hydraulic pressure applied thereto by pump 70. The actuator comprises a cylinder 145 having a piston 146 reciprocally mounted therein and connected to piston 142 by a rod 147.

As a portion of the rotary valve mechanism, there is provided a means for controlling fluid flow to the actuator so there is fluid flow thereto only during those portions of the operating cycle when fluid is to be injected into the earth and after the stakes have been driven. Thus, pressure slot 148 is provided in the sleeve 91 and is in communication with conduit 75 by means of lateral passage 149 opening from longitudinal passage 111. One end of cylinder 145 has a conduit 150 adapted to register with slot 148 while the other end of the cylinder has a conduit 151 likewise adapted to register with such slot. Conduits 150 and 151 are tapped into casing 92 at points spaced 180 degrees apart, and angularly situated so that fluid enters cylinder 145 only after one of the stakes has been driven into the ground. Such fluid continues to enter the cylinder during 120 degrees of the operating cycle. Opposite ends of cylinder 145 are likewise connected to reservoir slot 115 by conduits 152 and 153 adapted to register therewith upon rotation of the sleeve. In this manner, fluid can be exhausted from the side of the piston 146 opposite that which is receiving the pressure fluid from slot 148.

Cylinder 141 has its opposite ends connected by conduits 154 and 155 to the respective stakes via flexible tubes 62. Check valves 156 and 157 are provided in these conduits so that fluid can be suitably drawn into the cylinder from vessel 14. Thus, while one side of cylinder 141 is drawing in a charge of liquid through 17, the other side is delivering its charge through check valve and hose to the stake.

In operation, after a stake has been driven into the ground, piston 146 has pressure fluid applied on one side thereof while the other side exhausts to the reservoir. Inasmuch as pump 70, like pumps 81 and 81a, is a positive displacement pump, a definite volume of hydraulic fluid will pass into cylinder 145 to drive piston 142 and pump a definite quantity of fluid through the driven stake. It will be noted that the resistance met by the fluid being injected will vary dependent upon the condition of the soil. Since pump 70 is of the positive displacement type, its head will vary with the resistance met by its discharge fluid. Accordingly, only sufficient pressure will be applied against piston 146 to drive piston 142, and this power requirement will be directly proportional to the resistance met by the injected fluid. Accordingly, power consumption is at a minimum and yet is always sufficient to inject the desired amount of fluid into the earth.

However, the hydraulic system is preferable due to its ease of transportation and to ready development of necessary power requirements with a minimum weight of equipment. Also, the particular length of the various portions of the operating cycle described above are to be understood as exemplary and can be varied in duration to suit the particular needs of any given situation.

While the connections of the various conduits into casing 92 are illustrated above, in many instances, to be in line longitudinally along the casing, it will often be preferred to stagger these connections, and to move the corresponding slots accordingly, in order to permit the connections to be more easily made. Also, it is possible to provide continuous pressure and reservoir slots around sleeve 91 and in communication with slots 110 and 148 and slot 115, respectively, so as to eliminate the end conduits 75 and 78 as well as to eliminate passages 111 and 117 and unions 77 and 79. Also, when using the passages and unions, slots 100 and 101 can be connected to passage 111 similarly as shown in Fig. 8A while slots 102, 103 and 104 can be connected to passage 117 similarly as shown in Fig. 8B, thereby eliminating tapping in conduits 83, 83a and 105.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. An apparatus for injecting fluid into the earth which comprises, in combination, a frame adapted to be moved horizontally relative to the earth, a stake mounted on the frame and having a fluid passage with a discharge port therefrom, means for moving said stake vertically, means for supplying fluid to said passage, and means for moving the stake horizontally along the frame, said last-mentioned means comprising a hydraulic piston and cylinder, a connection between the stake and piston, and means including a pump for supplying fluid to opposite sides of said piston for moving said stake alternately rearwardly and forwardly of the frame, said pump being synchronized to the rate of movement of said frame relative to the earth such that the stake is moved rearwardly at a rate equal to the forward speed of the frame.

2. The apparatus of claim 1 wherein said connection comprises a piston rod connected to said piston, and a first arm pivotally connected to said rod and to said stake.

3. The apparatus of claim 2 in combination with second and third arms forming an effective parallelogram with said first arm and stake respectively, said third arm being connected to and mounted in a fixed angular position with respect to said piston rod and extending parallel to the desired axial inclination of said stake with respect to the earth's surface, said second arm being pivotally connected to said stake and third arm.

4. The apparatus of claim 2 wherein said means for moving said stake vertically comprises a hydraulic piston and a cylinder, one pivotally connected to said frame and the other pivotally connected with said first arm, and pump means to supply hydraulic fluid to said last piston and cylinder.

5. An apparatus for injecting fluid into the earth which comprises, in combination, a frame adapted to move over the earth's surface, a stake, a track carried by the frame, a carriage assembly movable along said track, means for moving the stake vertically, linkage means pivotally connecting the carriage assembly and stake to maintain the latter in a fixed angular position relative to the frame during vertical movement of said stake, and means for moving said carriage assembly along said track.

6. The apparatus of claim 5 wherein said connecting means comprises a first arm pivoted at spaced points along its length to said carriage assembly and said stake, a second arm paralleling said first arm and pivotally connected to the stake, and a third arm having a fixed connection to the carriage and a pivotal connection to the second arm, said third arm being disposed with respect to the frame at an angle at which it is desired to so maintain the stake.

7. An apparatus for injecting fluid into the earth's surface which comprises, in combination, a frame adapted to move over the earth's surface, a stake having a fluid passage with a discharge port therefrom, a first piston and a first cylinder mounted on said frame, means connecting said first piston with said stake for horizontal movement of the latter in a direction opposite the movement of said frame as well as in the same direction as the movement of the frame, means including a pump for supplying fluid to said first piston at a rate such that said stake is moved horizontally in said direction opposite the movement of said frame at a speed equal to that of said frame with respect to the earth's surface, a second piston and cylinder mounted on said frame and connected to the stake for moving said stake in a vertical direction, means including a pump for supplying fluid to said second piston, and means for supplying fluid to said passage associated with said stake including a conduit connected to said passage and adapted to be connected to a source of fluid to be injected, and a pump mechanism including a part movable to vary the volume of a chamber forming a portion of said conduit, a valve limiting flow through said conduit to be in one direction, an actuator for moving said part responsive to hydraulic pressure and means including a pump for supplying hydraulic fluid to said actuator.

8. The apparatus of claim 7 wherein said means for supplying fluid to said first piston, and said means for supplying fluid to said second piston and to said actuator each includes a control valve and means are provided for synchronizing the opening and closing of such control valves in a manner that while said stake is being moved horizontally by said first piston in a direction opposite the movement of said frame, said second piston drives it downwardly into the earth's surface, said actuator causes said movable part to force fluid to be injected out of the stake passage and then said second cylinder withdraws said stake upwardly out of the earth's surface.

9. The apparatus of claim 8 wherein the control valve controlling flow to said first piston is operable to switch flow to the opposite side thereof to move the stake in the same direction as that of said vehicle at the same time the control valve controlling flow to said second piston is operable to switch flow to the opposite side thereof to withdraw the stake from the earth's surface.

10. An apparatus for injecting fluid into the earth's surface which comprises, in combination, a frame adapted to be moved over the earth's surface, a stake mounted on said frame and having a fluid passage with a discharge port therefrom, means for moving said stake horizontally along said frame parallel to the direction of movement of the latter, means on said frame for moving said stake vertically to drive it into and withdraw it from the earth, means for supplying fluid to be injected to said stake passage, separate means for actuating each of said moving means, and control means for the actuating means and the fluid supplying means synchronized with the movement of said frame so that said actuating means causes the moving means to move said stake horizontally in a direction opposite to and at a rate equal to that of said frame while also causing said means for moving the stake vertically to drive the stake into the earth, causing said fluid supplying means to inject fluid through said stake passage and then causing said means for moving vertically to withdraw the stake from the earth.

11. An apparatus for injecting fluid into the earth's surface at spaced apart points which comprises, in combination, a frame adapted to move along the earth's surface, a pair of stakes each having a passage with a discharge port therefrom, means supplying fluid to be injected to said stakes, means on the frame for alternately moving the stakes back and forth along said frame, and means on the frame for moving the stakes vertically comprising a piston and cylinder for each stake, one of each such cylinders and pistons connected to the frame and the other to a stake, means supplying hydraulic fluid alternately to said cylinders to a side of the piston in each cylinder such as to cause the piston to move and drive a stake into the earth, and a closed hydraulic circuit between the cylinders on the sides of said pistons opposite to that which said fluid is applied such that movement of one piston to drive its stake downwardly into the earth exhausts fluid to the other piston causing it to move its stake upwardly.

12. The apparatus of claim 11 wherein said means supplying hydraulic fluid is a positive displacement type pump and wherein a first by-pass conduit is connected between the discharge from said pump to said closed circuit and a second by-pass conduit is connected to said circuit, each of said by-pass conduits having pressure relief valves therein.

References Cited in the file of this patent

UNITED STATES PATENTS

| | | |
|---|---|---|
| 339,279 | Olsen | Mar. 12, 1889 |
| 525,731 | Walther | Sept. 11, 1894 |
| 674,343 | Oakes | May 14, 1901 |
| 838,796 | Milton | Dec. 18, 1906 |
| 1,045,647 | Wallace | Nov. 26, 1912 |
| 1,871,529 | Karshner | Aug. 16, 1932 |
| 2,075,482 | Thorpe | Mar. 30, 1937 |
| 2,109,393 | Le Bleu | Feb. 22, 1938 |
| 2,181,540 | Adams | Nov. 28, 1939 |
| 2,193,575 | Thompson | Mar. 12, 1940 |
| 2,306,165 | Irish | Dec. 22, 1942 |
| 2,536,881 | Lytle | Jan. 2, 1951 |
| 2,548,621 | Rutledge | Apr. 10, 1951 |
| 2,649,061 | Hawkins et al. | Aug. 18, 1953 |

FOREIGN PATENTS

| | | |
|---|---|---|
| 117,155 | France | Mar. 2, 1877 |
| 435,406 | Great Britain | Sept. 23, 1935 |